Patented Nov. 25, 1952

2,619,503

UNITED STATES PATENT OFFICE 2,619,503

CATALYTIC HYDROGENATION OF DINITRO-AROMATIC COMPOUNDS

Roland George Benner and Arthur Charles Stevenson, Carneys Point, N. J., assignors to E. I. du Pont de Nemours & Company, Wilmington, Del., a corporation of Delaware No Drawing. Application September 5, 1947, Serial No. 772,462

3 Claims. (Cl. 260—580)

This invention relates to a process for the hydrogenation of aromatic polynitro compounds; and more particularly the invention relates to a process for the catalytic hydrogenation of aromatic polynitro compounds in an aqueous medium to produce the corresponding aromatic polyamines.

While the reduction of aromatic nitro compounds to form arylamines has long been known, the processes employed have heretofore involved the use of iron, tin, zinc, or other suitable metal in acid and alkaline solutions, or alkaline sulfides, or other inorganic reducing compounds. The direct reduction of nitro compounds to arylamines with hydrogen and a catalyst offers the advantages of simplicity, economy of reactants, and avoidance of the necessity for separating the arylamine product from other reaction products and reactants. However, attempts to perform such catalytic hydrogenations in the past had led to the conclusion that hydrogenation could not be performed in the presence of water. It was believed that it was necessary to perform the reduction in a solvent for the aromatic nitro compound. Reductions carried out in highly concentrated alcoholic solutions were observed to cease when a large proportion of water had accumulated from the reaction. The use of organic solvents such as alcohol are impractical, not only because of the cost of the solvent, but more especially because of the hazard involved in mixing polynitro compounds, which are strong oxidizing agents as well as explosives, with the readily oxidizable alcohol or other organic solvent.

It is an object of the present invention to provide a practical, economical, and non-hazardous process for the catalytic hydrogenation of aromatic polynitro compounds. It is a further object of this invention to provide such a process which is continuous. Other objects and advantages of the invention will become apparent from the following specification and claims.

It has now been found that aromatic polynitro compounds which are immiscible with water and which reduce to form water-soluble polyamines may be hydrogenated by dispersing or suspending the polynitro compound with rapid agitation in at least an equal weight of water in the presence of a hydrogenation catalyst therefor while introducing hydrogen, the polynitro compound being added in small increments or continuously at a rate which provides for reduction to the corresponding polyamine substantially as rapidly as the polynitro compound is added, that is, not more than 10%, and preferably not more than 2%, of the total polynitro compound to be hydrogenated is present in the charge in the unreduced state at any given time.

The process may be made fully continuous by introducing water and catalyst along with the polynitro compound continuously into the reaction vessel and continuously transferring a portion of the charge from a point remote from the point in the reaction vessel at which the polynitro compound is introduced, to a second similar agitated reaction vessel in which the hydrogenation is completed by the continuous addition of hydrogen and from which a solution of the resulting polyamine is withdrawn, filtered to remove the catalyst, and evaporated to isolate the polyamine. In order to maintain a balance, the stream withdrawn from each vessel contains organic material equivalent in amount to that introduced and water is added to the first hydrogenator at such a rate that the total volumes of liquids added and withdrawn per unit time are approximately the same.

An essential feature of the invention is the rapid and effective agitation of the charge. A vaned disc agitator with proper baffling on the inner wall of the reactor is found to work well. Other agitators designed to deliver the same power to the charge to disperse the polynitro compound and the hydrogen may also be used. Sufficient power is applied to the vaned disc agitator to deliver at least 20 and preferably 40–60 H. P. per thousand gallons of charge (without gas flow). The lower power inputs can be used but the reaction time is lengthened proportionally. Higher power inputs can also be used with some increase in reaction rate. An input of at least 20 H. P. is required to disperse the polynitro compound adequately.

The agitation disperses the polynitro compound in the water in a finely divided state, maintains the catalyst in suspension in the water and serves to bring the hydrogen into contact with the polynitro compound in the presence of the catalyst. The two reactants and the catalyst are insoluble in water and in each other so the agitation is essential to bring them together in a reactive condition. The more efficiently this is done the more rapidly the reaction can take place. There should be an amount of water at least equal to the weight of polynitro compound so the water will be the external phase rather than be dispersed in the compound. Preferably the resulting amine compound should not be allowed to build up to a concentration which exceeds its solubility in water. In a batch operation the amount of water present should be sufficient to dissolve all of the amine to be formed. In a continuous process the aqueous solution should be withdrawn and water added at such a rate that the amine produced is maintained in solution.

The success of this method depends not only on the effectiveness of the agitation but also on the rate of addition of the nitro body to the reaction mass. If the nitro body is added too rapidly and is allowed to build up in the charge beyond the concentrations specified above, the catalyst becomes wetted with the unreacted oily nitro body. The catalyst, collecting in the non-aqueous phase, is removed from the aqueous phase and the reaction stops. If on the other hand, the nitro body is added slowly and continuously or in small portions, preferably from 0.1 to 2% of the total charge, the reaction proceeds without difficulty. The size of the portion of nitro body which can be added to the reducing charge should under no conditions constitute more than about 10% of the charge. The preferred procedure consists in adding the dinitro body, in portions consisting of approximately 0.8% of the total charge of nitro body to be reduced, to a reaction mass containing sufficient water to maintain the resulting amine in solution, preferably a quantity of water which gives, as a final result, a 20% to 40% solution of the amine. The successive portions of nitro body are not added until the previous portion is largely reduced as evidenced by a sharp decline in the rate of hydrogen absorption.

The reduction is carried out at temperatures from about 40° up to about 100° C., and preferably in the range of 65° to 80° C. Below about 40° C. the reaction becomes excessively slow and above 100° C. undesired reactions may take place due to the oxidizing action of the dinitro body. Our experience with the reduction of aromatic dinitro compounds in aqueous dispersion at 100° C. to 200° C., using nickel catalyst, showed the reaction to be hazardous and the product in one case as a charred mass. With our procedure for adding the polynitro body continuously or in small shots as the reduction proceeds at the specified temperatures the hazard is practically eliminated. An additional advantage in using temperatures below about 100° C. is that the reduction may be performed at atmospheric or somewhat elevated pressures, whereas at higher temperatures sufficient pressure would be necessary to maintain the water in a liquid state. The temperature may be controlled by providing the reactor with coils through which water is circulated.

The hydrogenation catalysts which may be employed successfully include the platinum metals group of the periodic system and preferably palladium and platinum. Other metals of group VIII of the periodic system are not sufficiently active catalysts at the above reaction temperatures. The catalyst is prepared, for example, in accordance with the method described in U. S. Patent No. 2,285,277, issued June 2, 1942. Practically speaking, the preferred proportions of catalyst lie between about 0.005 and 0.03% of metal based on the total weight of polynitro compound to be hydrogenated. It should be understood, however, that smaller proportions may be used, if a much lower rate of hydrogenation is not objectionable, and that larger proportions may be used, for example, when the advantages of the faster reaction obtained thereby justify the great expenditure for catalyst.

The general procedure described can be used for the reduction of any aromatic polynitro compounds which are immiscible with water but which give water-soluble amines upon reduction. Included in this group are the isomeric di- and tri-nitrobenzenes, di- and tri-nitrotoluenes, di- and tri-nitroethylbenzenes, and di- and tri-nitrophenols and cresols. Those which are liquid at reaction temperatures are preferred, but those which are not can be used in the form of finely divided powders.

The more detailed practice of the invention will now be illustrated by the following examples, in which parts are by weight unless otherwise specified:

*Example 1*

A reactor equipped with baffles, a vaned disc agitator and cooling coils was charged with 3,000 parts by weight of water and 0.816 part of palladium metal catalyst supported on charcoal. The agitator was started and the charge heated to 70° or 75° C. Hydrogen was introduced directly under the disc agitator and 2725 parts of molten 2,4-dinitrotoluene were fed, in portions of approximately 26 parts each, to the well agitated reaction mass over a period of 8–10 hours. The temperature was controlled between 70° and 75° C. during the reaction by passing water through the cooling coils. Each portion of the 2,4-dinitrotoluene was almost completely hydrogenated before adding the next portion. Hydrogen was supplied at atmospheric pressure as rapidly as it was consumed by the reaction. After all the 2,4-dinitrotoluene was fed and the reaction was complete, the charge was filtered to remove the catalyst and water was distilled from the resulting 30% solution of the product, 2,4-diaminotoluene. The product was finally fractionally distilled under vacuum giving a yield of 1835 parts of 2,4-diaminotoluene having a freezing point of 97° C. This corresponded to a yield of 91.3% of the theoretical 100% yield.

*Example 2*

Using the apparatus and procedure of Example 1, 3757 parts of meta-dinitrobenzene were fed in portions of approximately 37 parts each to the well agitated suspension of 1.3 parts of palladium catalyst in 3111 parts of water over a period of eight to nine hours. After all the dinitrobenzene was fed and the reaction was complete the charge was worked up as in Example 1. A yield of 2258 parts of meta-phenylenediamine having a freezing point of 62.8° C. was obtained, corresponding to a yield of 93.5% of the theoretical yield.

By this invention a practical, economical and non-hazardous process for the catalytic hydrogenation of aromatic polynitro compounds is provided. It has the especial advantage over commercial processes previously used in avoiding the use of inorganic reducing compounds which add to the expense of the reduction, and which contaminate the amine product making separation procedures necessary. It has the particular advantage over catalytic hydrogenation methods utilizing organic solvents of avoiding the hazard and expense of such solvents and, more especially, of avoiding the hazard of mixing these oxidizing agents with oxidizable solvents. The process directly produces relatively pure products by a simple process which may be made continuous when desired.

From a consideration of the above specification it will be apparent that many changes may be made in the details given therein without departing from the spirit and scope of the invention or sacrificing the advantages to be derived therefrom. It is to be understood that the invention is not limited to the above specific embodiments thereof except as defined in the appended claims.

We claim:

1. A process for the catalytic hydrogen reduction of an aromatic dinitro compound to form the corresponding diamine compound which comprises rapidly agitating at temperatures within the range of about 40° to 100° C. an aqueous suspension of a catalyst selected from the group consisting of palladium and platinum, introducing hydrogen at atmospheric to somewhat elevated pressure and a water-immiscible dinitro compound selected from the group consisting of dinitrobenzene, dinitrotoluene and dinitroethylbenzene into said suspension slowly at correlated rates which provide for reduction of said dinitro compound to the corresponding diamine compound substantially as rapidly as the dinitro compound is added, the rate of introduction of said dinitro compound being such that not more than about 10% of the total dinitro compound to be reduced is present in the suspension at any given time, maintaining the temperature of the reaction mass within the range of about 40° to 100° C. during the reduction of said dinitro compound and providing sufficient water in the reaction mass to at least equal the weight of dinitro compound present at any time and sufficient to maintain the diamine compound in solution, and then recovering the diamine compound formed.

2. A process for the catalytic hydrogen reduction of an aromatic dinitro compound to form the corresponding diamine compound which comprises rapidly agitating at temperatures within the range of about 40° to 100° C. an aqueous suspension of a catalyst selected from the group consisting of palladium and platinum in a reaction vessel, introducing into said reaction vessel a portion not exceeding about 2% of the total amount and not exceeding the weight of water in said suspension of a water-immiscible dinitro compound selected from the group consisting of dinitrobenzene, dinitrotoluene and dinitroethylbenzene, reducing said portion of the dinitro compound to the corresponding diamine compound by introducing hydrogen into said reaction vessel at atmospheric to somewhat elevated pressure, continuing to introduce further portions of said dinitro compound and hydrogen when each preceding portion has been substantially completely reduced, maintaining the temperature of the reaction mass within the range of about 40° to 100° C. during the reduction of said dinitro compound and providing sufficient water in the reaction mass to at least equal the weight of dinitro compound present at any time and sufficient to maintain the diamine compound in solution, and then recovering the diamine compound formed.

3. A process for the continuous catalytic hydrogen reduction of an aromatic dinitro compound to form the corresponding diamine compound which comprises continuously introducing into a reaction vessel a water-immiscible dinitro compound selected from the group consisting of dinitrobenzene, dinitrotoluene and dinitroethylbenzene, hydrogen at atmospheric to somewhat elevated pressure, a catalyst selected from the group consisting of palladium and platinum and a quantity of water not less than the weight of said dinitro compound and sufficient to maintain diamine compound formed in solution, rapidly agitating the reaction mass in said vessel while maintaining the temperature within the range of about 40° to 100° C., continuously withdrawing water containing the diamine compound formed and suspended materials from said vessel at such a rate that the total volumes of liquids added and withdrawn per unit of time are approximately the same, and recovering the diamine compound.

ROLAND GEORGE BENNER.
ARTHUR CHARLES STEVENSON.

REFERENCES CITED

The following references are of record in the file of this patent:

UNITED STATES PATENTS

| Number | Name | Date |
|--------|------|------|
| 1,689,014 | Dieterle | Oct. 23, 1928 |
| 1,765,660 | Dawes | June 24, 1930 |
| 1,878,950 | Tyford | Sept. 20, 1932 |
| 2,402,423 | Mason | June 18, 1946 |

FOREIGN PATENTS

| Number | Country | Date |
|--------|---------|------|
| 6,409 | Great Britain | 1915 |

OTHER REFERENCES

Strel-tsova et al.: "Chem. Abstr.," vol. 36, p. 418 (1942).

PB Report 30,049, Office of Publication Board, U. S. Dept. Commerce, Washington, D. C. (publication date Feb. 21, 1947).

Strel-tsova et al.: "Chem. Abstr.," vol. 38, pp. 1214–1215.